United States Patent
Engi et al.

(10) Patent No.: US 12,212,819 B2
(45) Date of Patent: Jan. 28, 2025

(54) IN-BAND METADATA FOR AUTHENTICITY AND ROLE-BASED ACCESS IN ENTERPRISE VIDEO STREAMING SERVICES

(71) Applicant: Cisco Technology, Inc., San Jose, CA (US)

(72) Inventors: Derek Engi, Ferndale, MI (US);
Gonzalo Salgueiro, Raleigh, NC (US);
Pascale Delaunay, La Verne, CA (US);
Julie Allen, Sioux Falls, SD (US);
Rekha Gopikrishnan, Redmond, WA (US); Goudam Jaganmohan Muralitharan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 581 days.

(21) Appl. No.: 17/237,254

(22) Filed: Apr. 22, 2021

(65) Prior Publication Data
US 2022/0345790 A1 Oct. 27, 2022

(51) Int. Cl.
*H04N 21/8358* (2011.01)
*G06F 21/16* (2013.01)
(Continued)

(52) U.S. Cl.
CPC ......... *H04N 21/8358* (2013.01); *G06F 21/16* (2013.01); *G06F 21/64* (2013.01);
(Continued)

(58) Field of Classification Search
CPC ......... H04N 21/8358; H04N 21/23892; H04N 21/44008; H04N 21/44; H04N 7/147;
(Continued)

(56) References Cited

U.S. PATENT DOCUMENTS

| 8,121,342 B2 | 2/2012 | Davis et al. |
| 2002/0001395 A1* | 1/2002 | Davis ............... G06F 21/10 704/E19.009 |

(Continued)

FOREIGN PATENT DOCUMENTS

| CN | 101287014 A | * 10/2008 | |
| CN | 104185998 A | * 12/2014 | ....... H04N 21/23476 |

(Continued)

OTHER PUBLICATIONS

Haojin Yang and Christoph Meinel; (Content Based Lecture Video Retrieval Using Speech and Video Text Information); p. 13; Date of publication Feb. 26, 2014; date of current version 2 Jul. 2014.*

(Continued)

*Primary Examiner* — Eleni A Shiferaw
*Assistant Examiner* — Ali H. Cheema
(74) *Attorney, Agent, or Firm* — BEHMKE INNOVATION GROUP LLC; James M. Behmke; Keith O. Mitchell

(57) ABSTRACT

A device receives a video stream, where one or more frames of the video stream include embedded metadata that is embedded directly into the one or more frames. The device extracts the embedded metadata from the one or more frames. The device makes an authentication determination regarding the video stream, based on whether the embedded metadata includes a digital signature associated with a sender of the video stream. The device controls, based on the authentication determination, presentation of the video stream to a recipient user.

18 Claims, 8 Drawing Sheets

(51) Int. Cl.
*G06F 21/64* (2013.01)
*H04L 9/32* (2006.01)
*H04N 7/14* (2006.01)
*H04N 21/2389* (2011.01)
*H04N 21/44* (2011.01)
*H04N 21/442* (2011.01)

(52) U.S. Cl.
CPC ............ *H04L 9/3247* (2013.01); *H04N 7/147* (2013.01); *H04N 21/23892* (2013.01); *H04L 9/3239* (2013.01); *H04N 21/44008* (2013.01); *H04N 21/44236* (2013.01)

(58) Field of Classification Search
CPC ......... H04N 7/152; G06F 21/16; G06F 21/64; H04L 9/32; H04L 9/3247; H04L 2209/60; G06K 9/00
USPC .......................................................... 713/176
See application file for complete search history.

(56) References Cited

U.S. PATENT DOCUMENTS

| | | | | |
|---|---|---|---|---|
| 2002/0004906 | A1* | 1/2002 | Rajasekharan | H04N 21/6334 726/2 |
| 2004/0177383 | A1* | 9/2004 | Martinolich | H04N 21/23892 375/240 |
| 2008/0180571 | A1* | 7/2008 | Chuang | H04N 7/08 348/E7.001 |
| 2008/0240490 | A1* | 10/2008 | Finkelstein | H04N 21/235 382/100 |
| 2010/0146287 | A1* | 6/2010 | Kreiner | H04L 63/12 713/176 |
| 2010/0312810 | A1* | 12/2010 | Horton | G06F 21/10 707/812 |
| 2015/0200940 | A1 | 7/2015 | Pace | |
| 2016/0105695 | A1* | 4/2016 | Qu | G09G 5/006 348/708 |
| 2016/0241829 | A1* | 8/2016 | Qu | H04N 21/43635 |
| 2016/0241865 | A1* | 8/2016 | Malone | H04N 19/46 |
| 2016/0277793 | A1* | 9/2016 | Eyer | H04N 21/435 |
| 2016/0286285 | A1* | 9/2016 | Geyzel | H04N 1/32165 |
| 2017/0373857 | A1* | 12/2017 | Schneider | H04N 21/4355 |
| 2018/0063139 | A1* | 3/2018 | Day | H04L 9/3236 |
| 2018/0084313 | A1* | 3/2018 | Splaine | H04N 21/44204 |
| 2019/0028441 | A1* | 1/2019 | Thakkar | H04L 63/062 |
| 2019/0158274 | A1* | 5/2019 | Tormasov | H04L 9/3239 |
| 2019/0251111 | A1* | 8/2019 | Stojancic | G06V 10/462 |
| 2020/0065526 | A1* | 2/2020 | Berman | G06T 1/0028 |
| 2020/0068256 | A1 | 2/2020 | Gordon | |
| 2020/0134230 | A1* | 4/2020 | Booth, Jr. | G06F 21/6245 |
| 2020/0177960 | A1* | 6/2020 | Rakshit | H04N 21/858 |
| 2020/0267404 | A1* | 8/2020 | Levy | H04N 21/23892 |
| 2020/0344220 | A1* | 10/2020 | Thakkar | H04L 9/3247 |
| 2021/0409825 | A1* | 12/2021 | Meyer | H04N 21/26208 |
| 2022/0334789 | A1* | 10/2022 | Kamaraju | G06F 3/1454 |

FOREIGN PATENT DOCUMENTS

| | | | | |
|---|---|---|---|---|
| CN | 109525845 | A * | 3/2019 | |
| EP | 2797333 | A1 * | 10/2014 | ......... H04N 21/4181 |
| EP | 2989803 | B1 * | 3/2019 | ......... H04N 21/4181 |

OTHER PUBLICATIONS

Jenn Riley; (Understanding Metadata); p. 49; Published by National Information Standards Organization (NISO) in (Year: 2017).*

Ningsih, et al., "MP4 Video Steganography Using Least Significant Bit (LSB) Substitution and Advanced Encryption Standard (AES)", Journal of Theoretical and Applied Information Technology, vol. 95, No. 21, Nov. 15, 2017, JATIT & LLS.

"Access Control with Enterprise Video Streaming", online: https://support.video.ibm.com/hc/en-us/articles/115005207569-Access-control-with-Enterprise-Video-Streaming, accessed Mar. 4, 2021, 49 pages, IBM Watson Media Support Center.

"Content Protection for Audio and Video Content", online: http://digitalwatermarkingalliance.org/digital-watermarking-applications/content-protection-audio-video-content/, accessed Mar. 5, 2021, 3 pages, Digital Watermarking Alliance.

Newman, Lily Hay, "Hacker Lexicon: What is Steganography?", online: https://www.wired.com/story/steganography-hacker-lexicon/, Jun. 26, 2017, 5 pages, Wired.

Slash, Black, "Steganography: How to Hide Secret Data Inside an Image or Audio File in Seconds", Nov. 11, 2017, 9 pages, Null-Byte.WonderHowTo.Com.

Gipp, et al., "Securing Video Integrity Using Decentralized Trusted Timestamping on the Bitcoin Blockchain", Tenth Mediterranean Conference on Information Systems (MCIS), Paphos, Cyprus, Sep. 2016, 10 pages.

Gouaillard, Alex, "Secure Frames (SFrames): End-to-End Media Encryption with #webrtc Now in Chrome", online: https://webrtcbydralex.com/index.php/2020/03/30/secure-frames-sframes-end-to-end-media-encryption-with-webrtc-now-in-chrome/; Mar. 30, 2020, 19 pages.

"Steganography", online: https://en.wikipedia.org/wiki/Steganography, Mar. 21, 2021, 12 pages, the Wikimedia Foundation, Inc.

"Pixel", online: https://en.wikipedia.org/wiki/Pixel, Mar. 21, 2021, 6 pages, the Wikimedia Foundation, Inc.

* cited by examiner

IN-BAND METADATA FOR AUTHENTICITY AND ROLE-BASED ACCESS IN ENTERPRISE VIDEO STREAMING SERVICES

TECHNICAL FIELD

The present disclosure relates generally to computer networks, and, more particularly, to in-band metadata for authenticity and role-based access in enterprise video streaming services.

BACKGROUND

Collaboration equipment, such as video conferencing equipment found in meeting rooms, kiosks, and the like are becoming increasing ubiquitous in many settings. For instance, meeting rooms in different geographic locations may be equipped with collaboration equipment that enable meeting attendees to video conference with one another. In addition, mobile devices, such as cellular phones, also now support video conferencing capabilities.

Recent advancement in machine learning have led to the emergence of realistic, fake videos often referred to as 'deep fakes.' Such videos present a real threat to video conferences and other forms of video streaming, as they can be used to launch personal attacks, spread disinformation, or for other nefarious purposes. While end-to-end encryption techniques (e.g., SFrame, etc.) can help to alleviate the risk of a deep fake being inserted into a video stream, these approaches still rely on exterior key management and additional protocol definitions, to create a safe channel.

DESCRIPTION OF EXAMPLE EMBODIMENTS

Overview

Figure 1A:
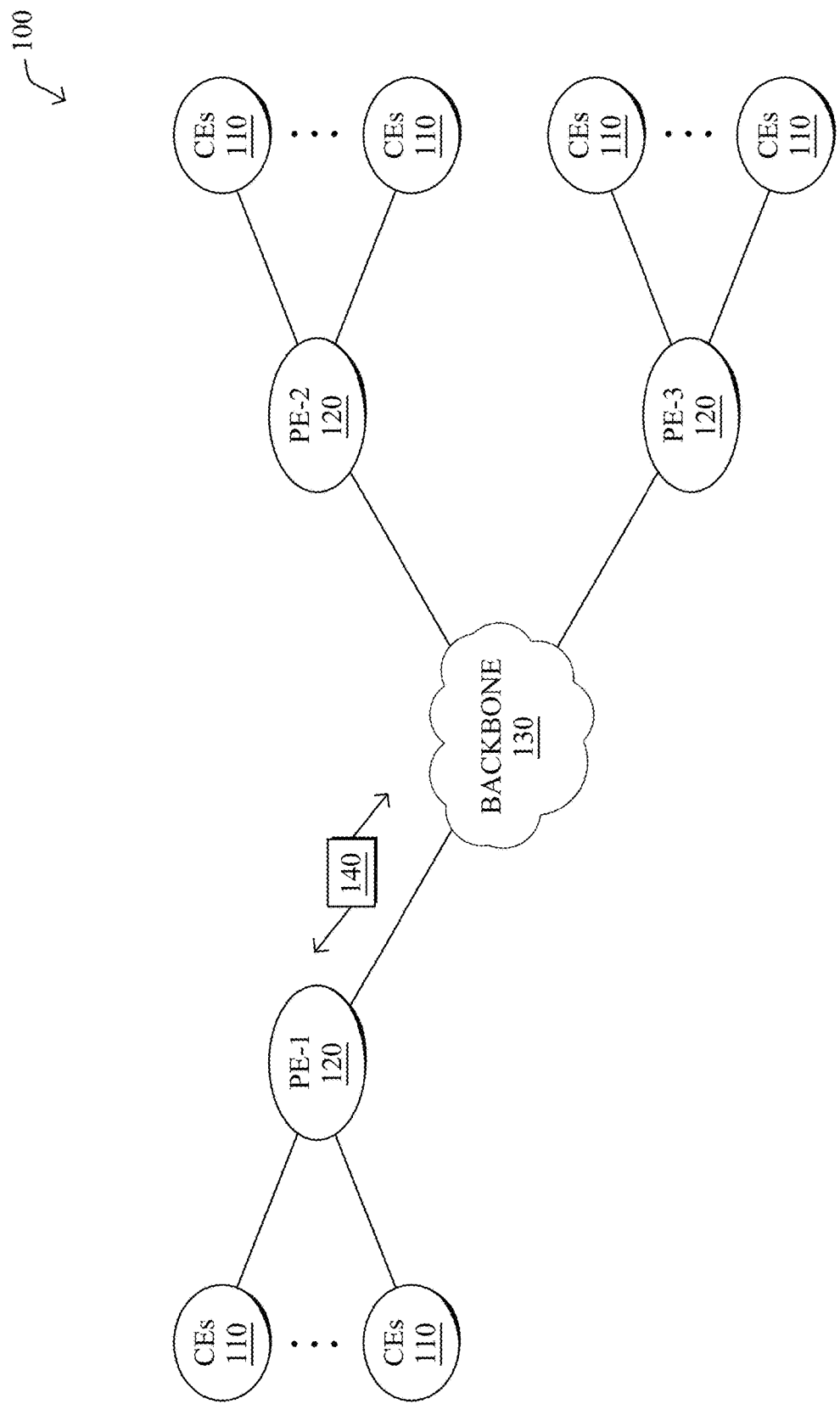
FIGS. 1A-1B illustrate an example communication network.

According to one or more embodiments of the disclosure, a device receives a video stream. One or more frames of the video stream include embedded metadata that is embedded directly into the one or more frames. The device extracts the embedded metadata from the one or more frames. The device makes an authentication determination regarding the video stream, based on whether the embedded metadata includes a digital signature associated with a sender of the video stream. The device controls, based on the authentication determination, presentation of the video stream to a recipient user.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
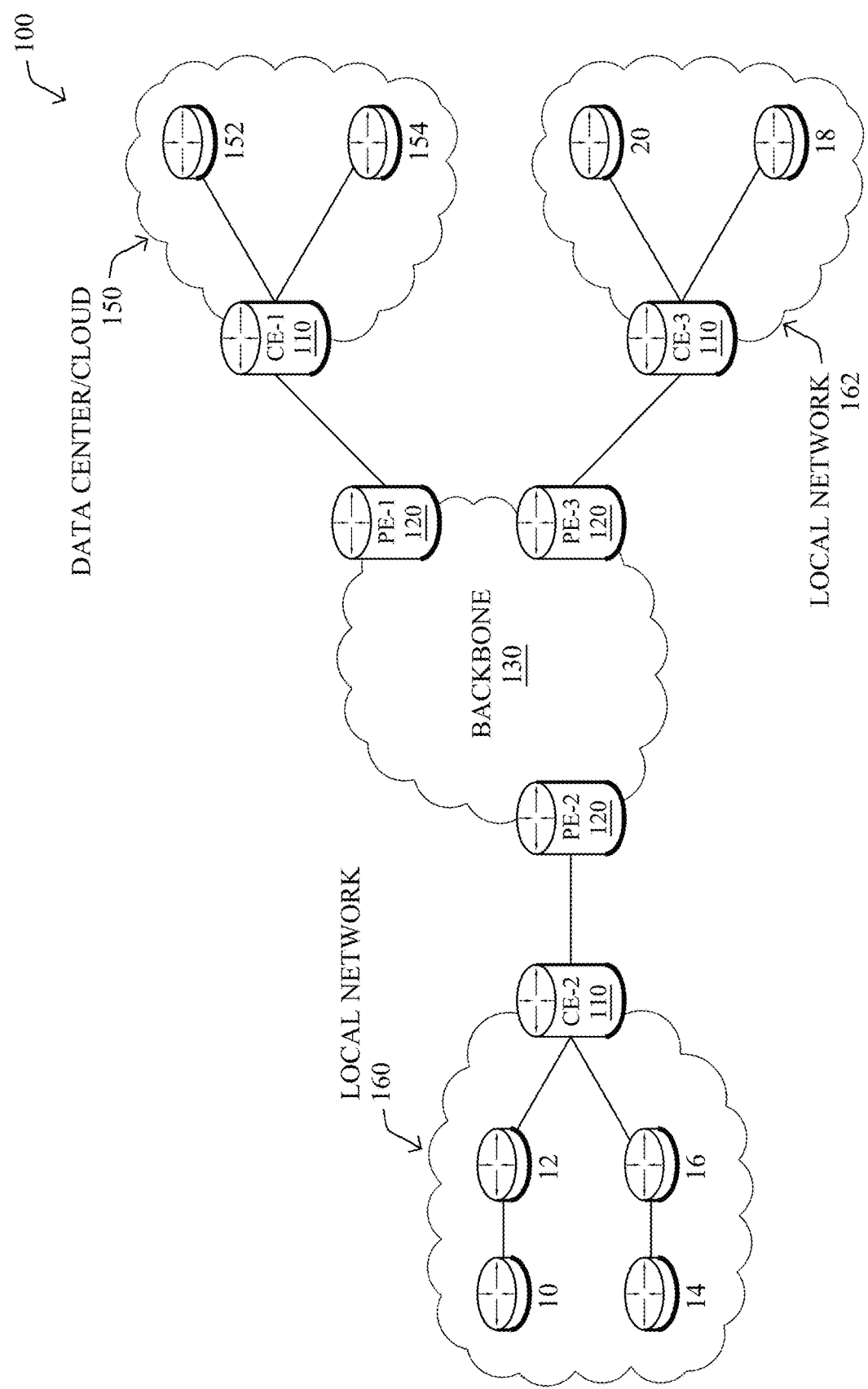

FIG. 1B illustrates an example of network 100 in greater detail, according to various embodiments. As shown, network backbone 130 may provide connectivity between devices located in different geographical areas and/or different types of local networks. For example, network 100 may comprise local network 160 and local network 162 (e.g., branch offices or networks) that include nodes/devices 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a server that provides a video conferencing/collaboration service (e.g., a management service), a server that provides a meeting scheduling service, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
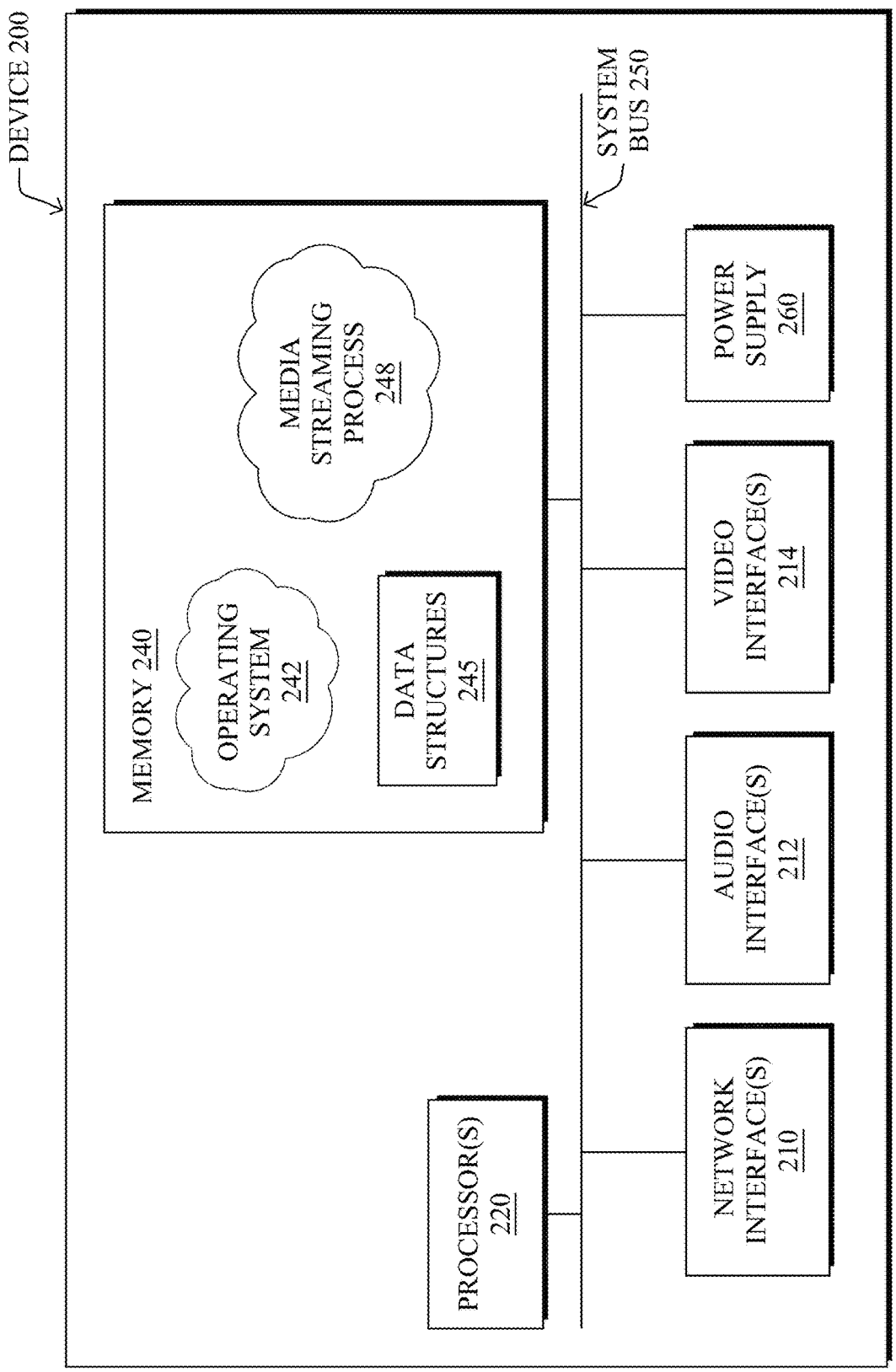
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below (e.g., a video conferencing/collaboration endpoint, a device that provides a management or booking service, etc.). The device 200 may also be any other suitable type of device depending upon the type of network architecture in place, such as IoT nodes, etc. Device 200 comprises one or more network interfaces 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The audio interface(s) 212 may include the mechanical, electrical, and signaling circuitry for transmitting and/or receiving audio signals to and from the physical area in which device 200 is located. For instance, audio interface(s) 212 may include one or more speakers and associated circuitry to generate and transmit soundwaves. Similarly, audio interface(s) 212 may include one or more microphones and associated circuitry to capture and process soundwaves.

The video interface(s) 214 may include the mechanical, electrical, and signaling circuitry for displaying and/or capturing video signals. For instance, video interface(s) 214 may include one or more display screens. Preferably, at least one of the display screens is a touch screen, such as a resistive touchscreen, a capacitive touchscreen, an optical touchscreen, or other form of touchscreen display, to allow a user to interact with device 200. In addition, video interface(s) 214 may include one or more cameras, allowing device 200 to capture video of a user for transmission to a remote device via network interface(s) 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a media streaming process 248, as described herein, any of which may alternatively be located within individual network interfaces, the execution of which may cause device 200 to perform any or all of the functions described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
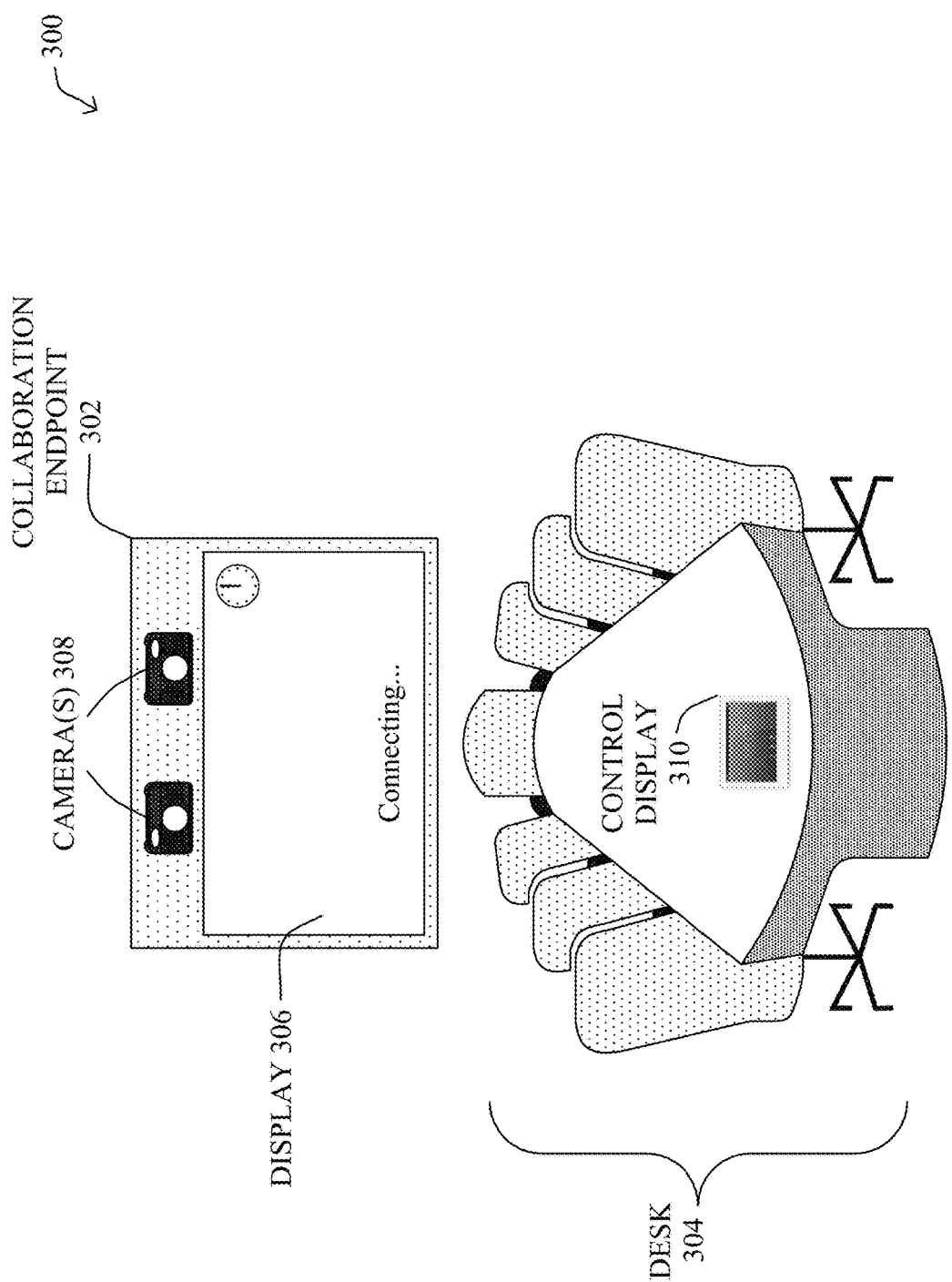
FIG. 3 illustrates various components of a video conferencing system in a meeting room.

Collaboration equipment is now being deployed in many different settings, greatly increasing the availability and uses of video conferences. For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such video conferencing may be achieved via a video conferencing/management service located in a particular data center or the cloud, which services to broker connectivity between collaboration endpoint 302 and the other endpoints for a given meeting. In addition, collaboration endpoint 302 may include a display 306 and/or speakers, to provide video and audio data captured by the other collaboration endpoints for a particular video conference.

Also as shown, a control display 310 may also be installed in meeting room 300 that allows a user to provide control commands for collaboration endpoint 302. For instance, control display 310 may be a touch screen display that allows a user to start a video conference, make configuration changes for the video conference or collaboration endpoint 302 (e.g., enabling or disabling a mute option, adjusting the volume, etc.

In some instances, the management service (e.g., Cisco WebEx Control Hub, etc.) may also interact with a scheduling/booking service (e.g., Microsoft Exchange, etc.) that allows an individual to reserve meeting room 300 during a particular range of time. For instance, to schedule meeting room 300 for a particular time, an individual may interact with the scheduling/booking service to review the availability of meeting room 300, flag meeting room 300 as reserved, and send out invitations (e.g., emails, etc.) to meeting participants. This allows the scheduling/booking service to provide other users with information as to the availability of meeting room 300 at all times.

Various policies may be applicable to the use of meeting room 300 in terms of its occupancy. For instance, a fire code may specify a maximum number of occupants of meeting room 300 at any given time. In further cases, such as due to a pandemic, this maximum occupancy may be reduced even further, so as to allow for social distancing between occupants of meeting room 300. For instance, the maximum occupancy of meeting room 300 may be set such that occupants are seated at desk 304 at acceptable distances between one another (e.g., at every other seat, at every third seat, etc.). Another form of occupancy rule may specify that meeting room 300 must be cleaned and/or sanitized, prior to being used for another meeting by different occupants.

As noted above, recent advancement in machine learning have led to the emergence of realistic, fake videos often referred to as 'deep fakes.' Such videos present a real threat to video streaming services that require trustworthiness (e.g., surveillance systems, videoconferencing systems, dashboard cameras, etc.), as they can be used to launch personal attacks, spread disinformation, or for other nefarious purposes.

While end-to-end encryption techniques (e.g., SFrame, etc.) can help to alleviate the risk of a deep fake being inserted into a video stream, these approaches still rely on exterior key management and additional protocol definitions, to create a safe channel. In other words, if a malicious entity were to infiltrate the encrypted communications, they could easily replace the contents of the communications. This is somewhat akin to assuming that the contents of a package have not been tampered with, provided the box of the package appears intact, which is not always the case.

In-Band Metadata for Authenticity and Role-Based Access in Enterprise Video Streaming Services The techniques herein introduce an authentication mechanism for video streams whereby the video frames themselves are used as the in-band channel to convey authentication data. In some aspects, the techniques herein do so by replacing certain bits of the video frames with signed metadata in a way that is nearly imperceivable by the users. In further aspects, the embedded metadata can be used not only to authenticate the sender of the video stream, but also to control which recipients are authorized to receive the video stream, such as based on their assigned roles.

Specifically, according to one or more embodiments of the disclosure as described in detail below, a device receives a video stream. One or more frames of the video stream include embedded metadata that is embedded directly into the one or more frames. The device extracts the embedded metadata from the one or more frames. The device makes an authentication determination regarding the video stream, based on whether the embedded metadata includes a digital signature associated with a sender of the video stream. The device controls, based on the authentication determination, presentation of the video stream to a recipient user.

Illustratively, the techniques described herein may be performed by hardware, software, and/or firmware, such as in accordance with media streaming process 248, which may include computer executable instructions executed by the processor 220 (or independent processor of interfaces 210) to perform functions relating to the techniques described herein.

Figure 4:
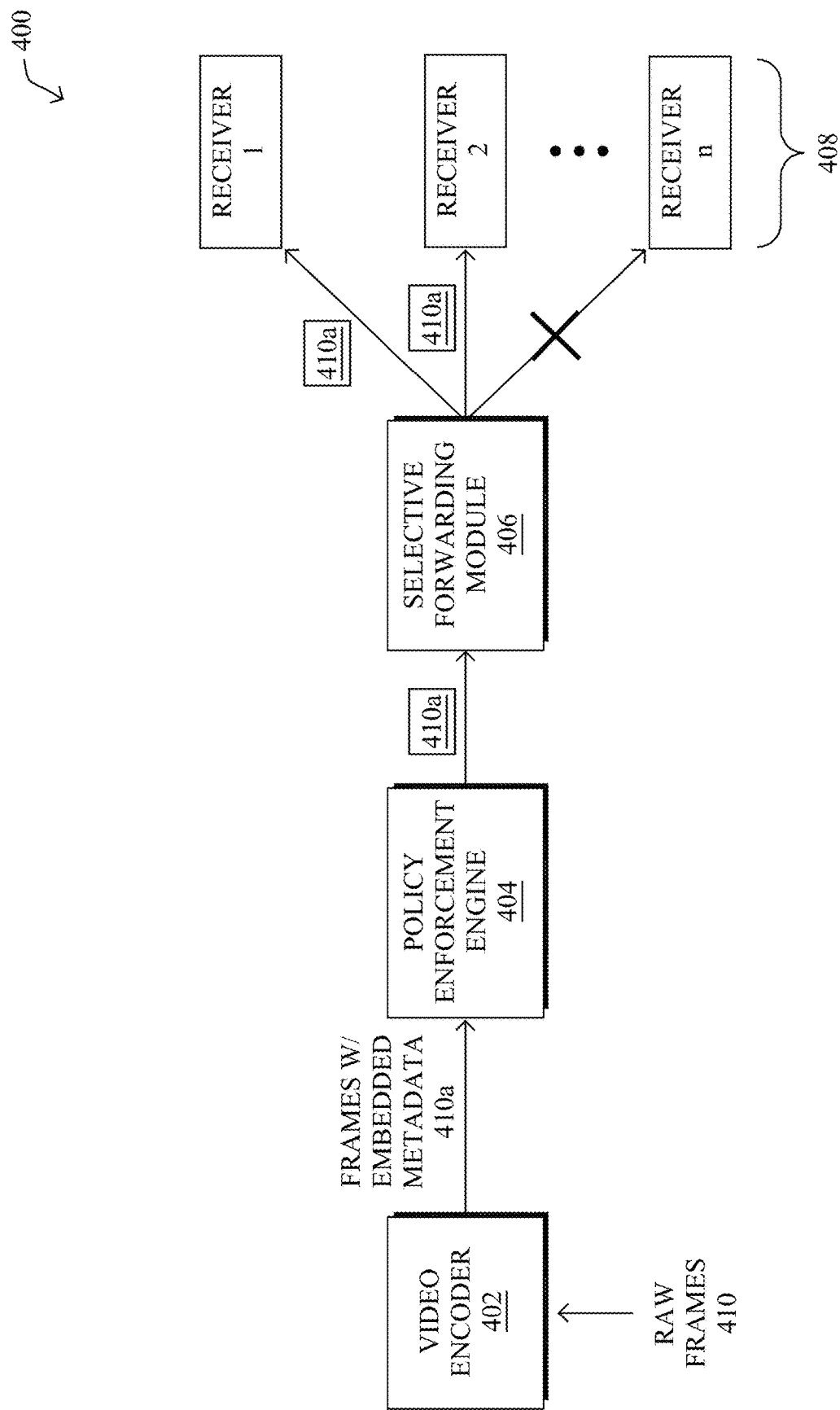
FIG. 4 illustrates an example architecture for leveraging in-band metadata for video authentication and role-based access.

Operationally, FIG. 4 illustrates an example architecture 400 for leveraging in-band metadata for video authentication and role-based access, according to various embodiments. In general, architecture 400 may be used to implement a media streaming process, such as media streaming process 248, and comprises any or all of the following components: a video encoder 402, a policy enforcement engine 404, and a selective forwarding module 406. In various embodiments, these components may be executed on a single device or in a distributed manner across multiple devices, in which case the combination of devices can be viewed as a singular device for purposes of the teachings herein. Further, the described functionalities of these components may also be combined, omitted, or implemented as part of other processes, as desired.

During operation, architecture 400 may leverage steganographic techniques to embed security and metadata information into one or more frames of a video stream, such as raw frames 410. In general, steganography is the practice of forming a concealed message within another message. Typically, this is done to protect the concealed message from exfiltration or encryption purposes. However, the techniques herein propose using steganography to create an in-band channel directly within the frames of the video stream that is used to convey origination and authentication metadata, to strengthen downstream policy enforcement decisions based on data transparent from the source and destination users, without requiring the overhead of an additional security protocol.

The embedded information provides the ability to sign and stamp individual video frames with content creator/source information, as well as provide a mechanism to insert metadata that can trigger role-based permissions when replaying a stream. In other words, the techniques herein propose using a video frame as a transport mechanism to store information for making policy decisions, verifying origination, and/or maintaining a ledger of authenticity before displaying video to its intended recipients.

As would be appreciated, the techniques herein allow for the authenticity information to be embedded directly into the video stream and close to the source of its frames, thereby removing the need for external key management. However, further embodiments still provide for the use of such external key management and encryption techniques to be employed in conjunction with the teachings herein.

Figure 5:
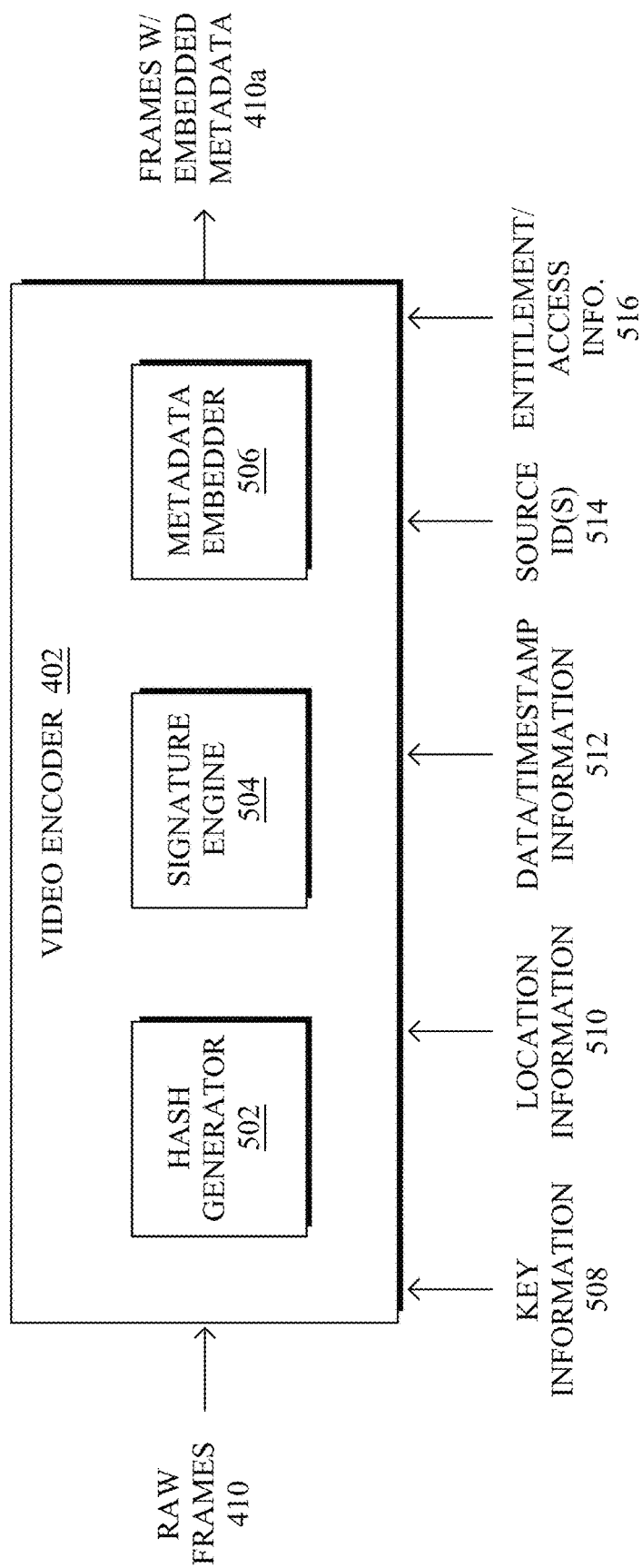
FIG. 5 illustrates an example architecture for the embedding of metadata directly into frames of a video stream.

FIG. 5 illustrates an example architecture 500 for video encoder 402, according to various embodiments. As shown, video encoder 402 may include any or all of the following components: a hash generator 502, a signature engine 504, and/or a metadata embedder 506, whose functionalities can be combined or omitted, as desired. Preferably, video encoder 402 is executed either directly on the device that captures raw frames 410 for the video stream or by a device in relatively close proximity thereto, so as to protect against any modification or replacement of raw frames 410 before processing by video encoder 402.

According to various embodiments, a key function of video encoder 402 is to encode raw frames 410 into a video stream for transmission, such as via the Real-time Transport Protocol (RTP), and to embed authentication and other metadata directly into raw frames 410, thereby forming modified frames 410a. To do so, metadata embedder 506 of video encoder 402 may first identify the least significant bits (LSBs) of a given frame in raw frames 410.

Typically, raw frames 410 may be represented as a collection of pixel information, with each pixel having an associated number of bits used to represent the color of that pixel, intensity, opacity, and/or other characteristics. Pixels today include upwards of $2^{24}$ bits, which can represent 16,777,216 different colors. According to various embodiments, video encoder 402 may identify the LSB of a given pixel, which it can manipulate to embed metadata into the frame. While this manipulation will result in a miniscule color change over some pixels, this color change will be virtually imperceivable to the users viewing the video stream. For instance, testing has shown that approximately 770,000 bits of uncompressed data can be embedded into a 1920×1080 pixel frame.

In some embodiments, hash generator 502 of video encoder 402 may generate a hash of a given video frame from raw frames 410 and signature engine 504 may sign it using key information 508, such as a key associated with the source of raw frames 410 (e.g., a particular device or system, a user, etc.). Metadata embedder 506 may then embed the signed hash into raw frames 410 by replacing their LSBs, accordingly.

In various embodiments, further metadata that video encoder 402 may embed into raw frames 410 and sign may be any or all of the following:

Location information 510 regarding the source of raw frames 410—for instance, Global Positioning System (GPS) coordinates or other location information can be inserted as metadata within raw frames 410, which can aid in authenticating raw frames 410. Indeed, if a frame is marked with location information that does not match that of the expected location of its supposed sender, this may indicate that the frame is a fake.

Date and/or timestamp information 512—such information can also be used to authenticate raw frames 410, as fake frames will either lack this stamping or have temporal information that does not coincide with the expected temporal information for the video stream.

Source ID(s) 514—information regarding the source of raw frames 410 can also be embedded as metadata directly into raw frames 410, such as a client name, other device(s) located near the source (e.g., as identified using ultrasonic client detection), or the like. This can also be used for authentication purposes, as this information can indicate the conditions under which the video stream occurred. Indeed, the count of ultrasonic client in the vicinity may imply that the source of raw frames 410 was located in a secure environment.

Ledger information—in addition to a hash of the current frame, the embedded metadata in the resulting frames 410a can also include a 'ledger' of information regarding prior frames, as well. Video encoder 402 may track this information as part of its processing of raw frames 410. For instance, the embedded metadata in 410a may include a sequence number associated with the current frame or even a listing of the hashes for the previous frames, which can help to further authenticate the frame. This can be used to ensure that there was a sufficient chain of custody for each frame between the encoding and decoding operations.

Entitlement/access information 516—in some embodiments, the embedded metadata in 410a may also indicate the user(s) that are authorized to receive and view the video stream. For instance, in the case of a videoconference, a corporate directory or other index of users could be leveraged, to embed information about the sender of the video stream and/or the set of user(s) that are authorized to view the video stream, such as based on their roles within the organization. Since this is done at the frame level, it now becomes possible to restrict viewing of segments of the video stream to certain users. For instance, while a traditional video conference may be viewed by any attendee in the virtual meeting room, the embedded metadata can also be used to control access to more sensitive information, even if a particular user is logged into the room.

Referring again to FIG. 4, once video encoder 402 has embedded the signed metadata into raw frames 410, it may send the resulting frames 410a with the embedded metadata to policy enforcement engine 404 for processing. In some embodiments, policy enforcement engine 404 may be executed by a central service that supports the distribution of the video stream to endpoint receivers, such as receivers 408 shown (e.g., a first through $n^{th}$ potential receiver of the video stream). For instance, policy enforcement engine 404 may be executed by a multipoint control unit (MCU), selective forwarding unit (SFU), or other mechanism that is responsible for the delivery of the video stream to receivers 408. In some instances, this may also entail combining different video streams into a final stream, such as in the case of a video conference.

Figure 6:
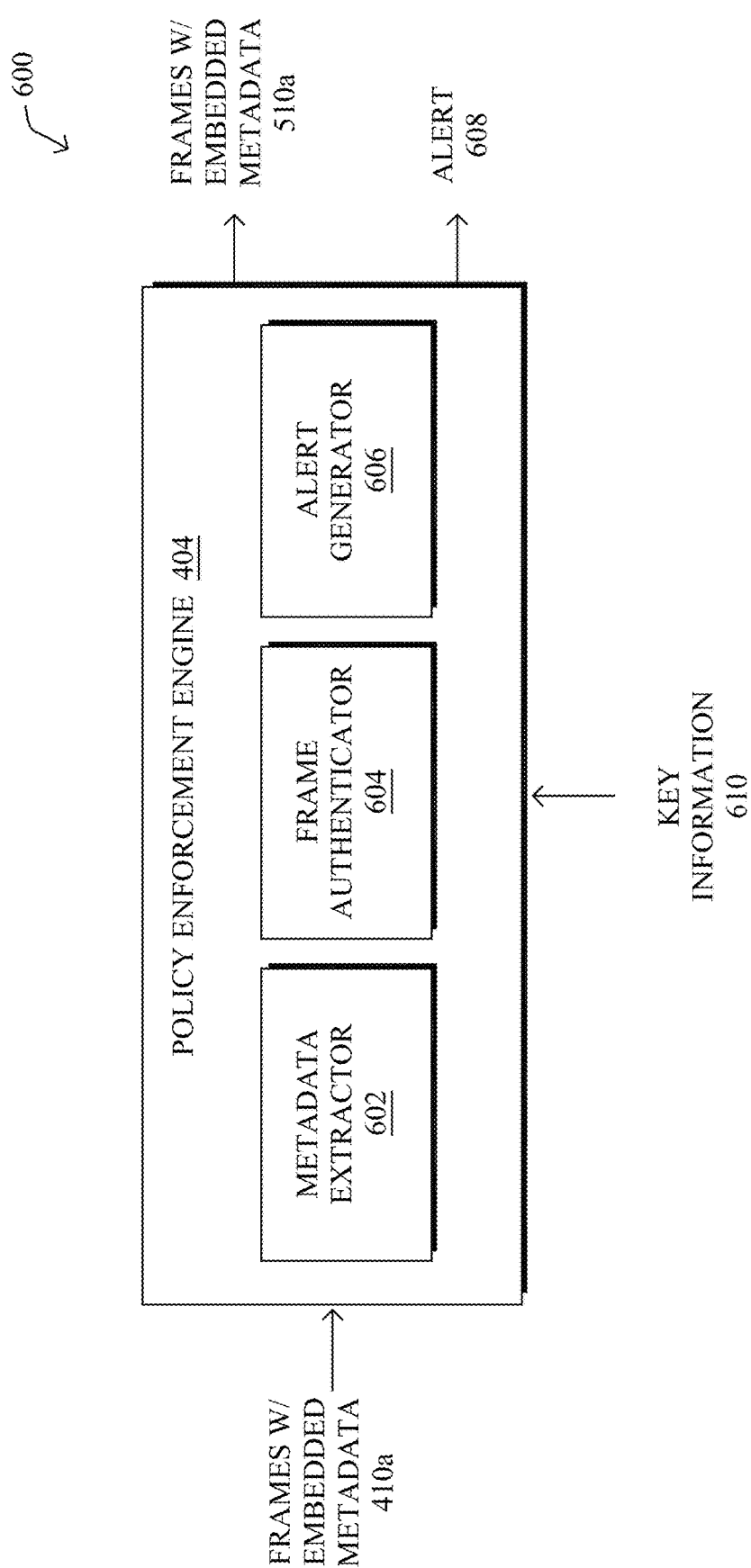
FIG. 6 illustrates an example architecture for the evaluation of embedded metadata in a video stream.

FIG. 6 illustrates an example architecture 600 for policy enforcement engine 404, according to various embodiments. As shown, 404 may include any or all of the following components: a metadata extractor 602, a frame authenticator 604, and/or an alert generator 606, whose functionalities can be combined or omitted, as desired.

According to various embodiments, metadata extractor 602 of policy enforcement engine 404 may be operable to extract the embedded metadata from frames 410a, which frame authenticator 604 then assesses to verify that a given frame truly originated from its purported source. To this end, frame authenticator 604 may leverage key information 610, which may include a public key associated with the source of raw frames 410, to verify the signature used to sign the embedded metadata in frames 410a (e.g., the signed hash of the frame, etc.). In further embodiments, frame authenticator 604 may also consider the other contents of the embedded metadata, in making its authentication decision. For instance, if the sequence number, embedded ledger, location information, data or timestamp information, etc. does not match what is expected, policy enforcement engine 404 may determine that the received frames are suspected of being fakes.

In cases in which frame authenticator 604 determines that it cannot verify the authenticity of a frame in frames 410a, it may notify alert generator 606, which generates a corresponding alert 608 and/or takes other mitigation actions. For instance, alert generator 606 may block the transmission of frames 410a, if frame authenticator 604 cannot verify their authenticity. Conversely, if frame authenticator 604 deems a frame in frames 410a as being authentic, frame authenticator 604 may overlay a watermark or other indication in a predefined location of the frame that the frame has been verified as authentic (e.g., a seal or other watermark, etc.), prior to sending the frame onward, such as to selective forwarding module 406.

Referring yet again to FIG. 4, architecture 400 may also include selective forwarding module 406, which is responsible for selecting the set of receivers within receivers 408 are to receive frames 410a, based on their embedded metadata, according to various embodiments. In some instances, this can be achieved through the explicit embedding of metadata regarding which users or devices are authorized to view the video stream. For instance, the metadata in frames 410a may indicate specific users that are authorized to view the video stream or entitlement/access information that selective forwarding module 406 may use to identify such users. For instance, selective forwarding module 406 may perform a user lookup for a clearance level indicated in the metadata of frames 410a. In further embodiments, selective forwarding module 406 may infer this information based on the other embedded metadata, such as the location from which raw frames 410 were sourced, etc. Typically, selective forwarding module 406 may be co-hosted with policy enforcement engine 404, although it can also be hosted elsewhere in communication therewith, as well.

Based on the assessment by selective forwarding module 406, selective forwarding module 406 may forward frames 410a on to their authorized receivers for presentation to their recipient users. For instance, assume that the $n^{th}$ receiver in receivers 408 is operated by a user that is not authorized to view frames 410a, based on their associated role. In such a case, selective forwarding module 406 may opt not to send frames 410a to that receiver, while still sending frames 410a on to those receivers that are authorized to view them.

To better illustrate the operation of architecture 400, consider the case of the chief executive officer (CEO) of a company delivering financial results over video that are not intended for the majority of the company or are limited to individuals with a particular confidentiality clearance. By integrating author origination data and confidentiality information into each video frame, the techniques herein allow the policy enforcement, decoding, and delivery of the video to the recipient clients to adhere to defined compliance rules. For instance, selective forwarding module 406 may integrate with existing corporate directory services, to verify the group memberships and entitlements based on the trust levels associated with the author and recipients. In short, selective forwarding module 406 may interface with standard corporate group management solutions to guarantee frame-by-frame access control based upon user-defined trust levels, completely transparent to either user and independent of additional security protocols and overhead. This can also be used in the public space, such as by having the author of a video stream in a streaming service restricting sections of their stream to users based on system-wide roles (possibly, subscription tiers in the streaming service) or custom roles defined by the author. Timestamps or expiration information embedded in the data channel can provide even tighter security controls and pivot points for policy enforcement engine 404 and selective forwarding module 406 to act upon.

In another example, consider the case in which the metadata embedded into the frames of a recorded videoconference include timestamped author information, an indication of the sequence of frames, and signed hashes, as well as compound role-based attributes such as group and confidentiality, to create a provenance of that recording. This information can then be used to verify that individual frames have not been tampered with and that they maintain the authenticity of the author that created the content. For example, as streaming frames are collected during a broadcast, policy enforcement engine 404 may keep track of the metadata embedded in each frame and verify the signature of the author. At the conclusion of the broadcast, policy enforcement engine 404 may publish this information as a ledger or appended it as the last frame of the video as a manifest of frame durations. If a video is watermarked by a partner or the victim of other tampering, playing back the video in context with the verification capabilities of this ledger would indicate that frame attributes do not match the original content.

An embedded ledger can also be leveraged for establishing trust between 3rd party organizations. For example, if a video recording of the CEO is to be used for highlights on a major news network, the digital rights management (DRM) marking for that video can be embedded and require a provenance check of the video recording so that the DRM encryption key can only be generated with the ledger validity checked. In addition, if the news network wants to create their own video recording that adds additional video content to the video from the CEO, while still leveraging the authenticity and ledger functions, their new video recording will have a new provenance and appended ledger with the previous ledger and provenance of any video clips used to create the new content.

As would be appreciated, the specific attributes to be included in the embedded metadata/in-band channel is not limited to the previous examples and other data can be included, in further embodiments. For instance, the techniques herein can also be used for other metadata categorization and verification purposes outside the realm of corporate directory and group management solutions. One such use case is potentially allowing the content creator to restrict the availability of segments in the video content based on geographic location. As content is created by a user, information as to their physical location (e.g., GPS coordinates, etc.), or the number of other BLUETOOTH® devices in a room that could be recording, can provide information to 3rd party verification systems as to the origination of content and potential witnesses or bystanders.

In another embodiment, the techniques herein could be used to embed a safety rating or categorization level on a frame-by-frame basis, allowing the techniques to be integrated into rating services, to block content that may not be appropriate for a certain viewing audience. For instance, certain scenes or frames of a movie may be marked as being rated 'R,' with the remainder of the movie being marked as rated 'PG-13.' This allows the R-rated portion of the movie to be edited out, should the viewer only be allowed to watch movies rated up to 'PG-13.'

Figure 7:
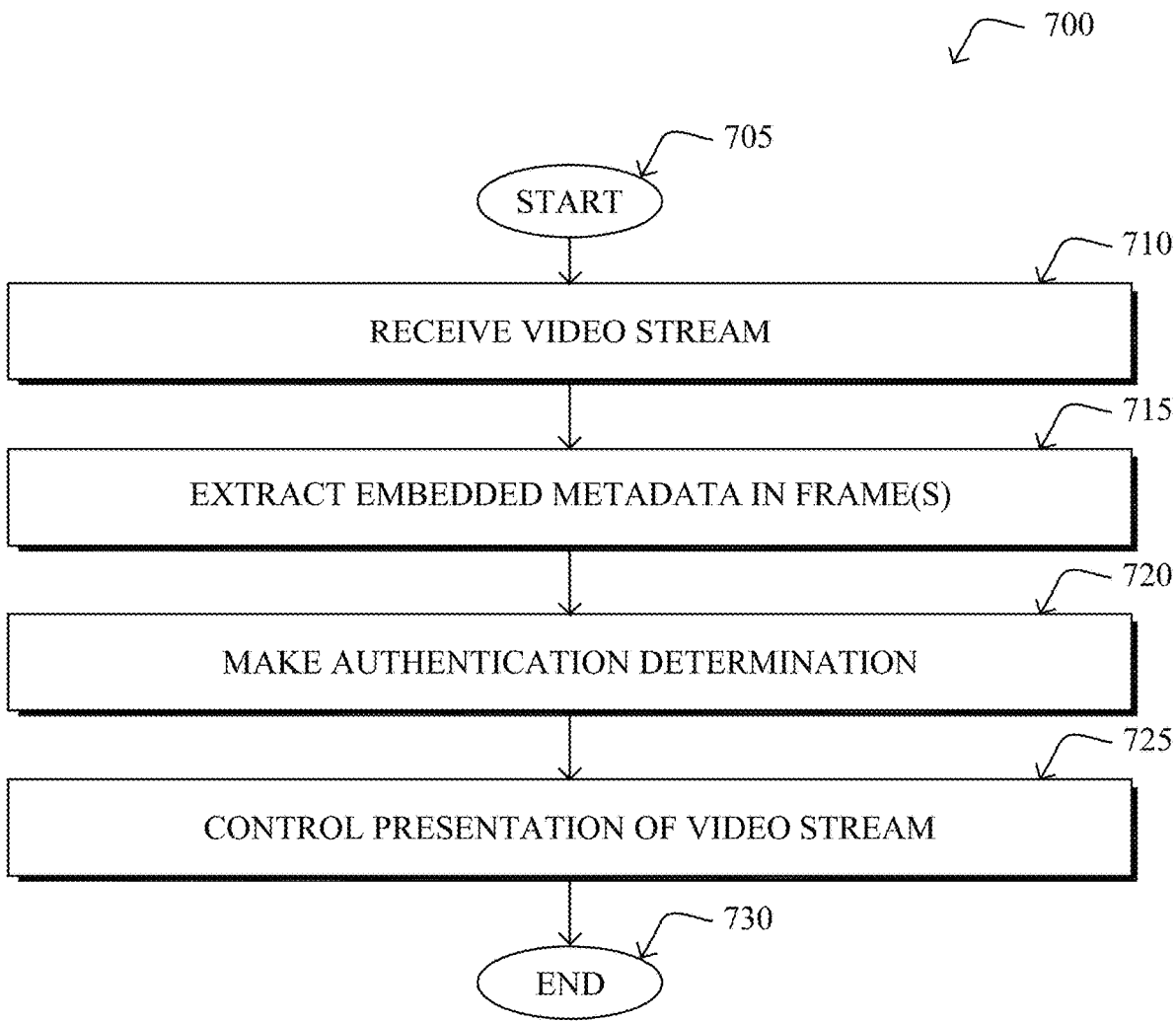
FIG. 7 illustrates an example simplified procedure for assessing embedded metadata in a video stream.

FIG. 7 illustrates an example simplified procedure 700 (e.g., a method) for ensuring occupancy policy compliance, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may receive a video stream. In various embodiments, one or more frames of the video stream include embedded metadata that is embedded directly into the one or more frames. For instance, the metadata may be embedded directly into the frame(s) by replacing one or more least significant bits of pixels of the frame(s) with the embedded metadata. As would be appreciated, the video stream my be any form of video stream, such as, but not limited to, video for a videoconference, surveillance video, and the like.

At step 715, as detailed above, the device may extract the embedded metadata from the one or more frames. In one embodiment, the embedded metadata comprises a hash of the one or more frames that was signed using a digital signature associated with the sender of the video stream. In another embodiment, the embedded metadata may comprise a listing of previous frame hashes of the video stream that were sent prior to that of the one or more frames. In a further embodiment, the embedded metadata may indicate an access level to which a recipient user is assigned. In another embodiment, the embedded metadata may comprise a sequence number for the one or more frames. In yet another embodiment, the embedded metadata may include location information associated with the sender of the video stream.

At step 720, the device may make an authentication determination regarding the video stream, based on whether the embedded metadata includes a digital signature associated with a sender of the video stream, as described in greater detail above. For instance, assume that the sender of the video stream signed the embedded metadata using a private key associated with that sender. In such a case, the device may use a corresponding public key for that sender, to verify that the frame was genuinely sent by that sender. In further embodiments, the device may also base the authentication in part on the embedded metadata, such as an embedded sequence number, embedded location information, etc.

At step 725, as detailed above, the device may control, based on the authentication determination, presentation of the video stream to a recipient user. Indeed, if the authentication determination of step 720 indicates that the frame(s) of the video stream are not authentic, the device may block the transmission of the video for view by the recipient user, generate an alert, and/or take other mitigation measures. Conversely, the device may send the video stream for presentation to the recipient user, if it is able to authenticate the video stream. In some embodiments, the device may further control the presentation of the video stream to that recipient user based on whether the recipient user is authorized to view the one or more frames, as indicated by the metadata embedded into those frame(s). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, protect video streams from deep fakes and other malicious acts, by embedding signed metadata directly into the frame(s) of the video that can be used to authenticate the video streams. As would be appreciated, this can be of particular importance for video streams that require trustworthiness, such as those associated with dashboard cameras, security cameras, videoconferencing equipment, and the like. In further aspects, the embedded metadata can also be used to control which users are authorized to view the video stream, such as based on the role of that user. Indeed, the techniques herein are flexible and could be used to embed any number of different attributes directly into the frames of a video, allowing the techniques to be applied to a large variety of use cases.

While there have been shown and described illustrative embodiments that provide for in-band metadata for authentication and role-based access, it is to be understood that various other adaptations and modifications may be made within the spirit and scope of the embodiments herein. For instance, while the techniques herein are described primarily with respect to certain types of video streams for purposes of illustration, the techniques herein can be applied to other forms of video streams, as well. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, a video stream, wherein one or more video frames of the video stream include embedded authentication metadata that is embedded directly into the one or more video frames by replacing one or more least significant bits of one or more pixels of the one or more video frames, wherein the embedded authentication metadata is used as an in-band metadata for authenticating the video stream;
   extracting, by the device, the embedded authentication metadata from the one or more video frames;
   making, by the device, an authentication determination regarding the video stream, based on the embedded authentication metadata, wherein the authentication determination includes i) verification of a digital signature associated with a sender of the video stream within the embedded authentication metadata to verify the video stream was genuinely sent by the sender, and ii) a determination to which users are authorized to view the video stream; and
   controlling, by the device and based on the authentication determination, presentation of the video stream to one or more recipient users.

2. The method as in claim 1, wherein the embedded authentication metadata comprises a hash of the one or more video frames that was signed using the digital signature associated with the sender of the video stream.

3. The method as in claim 1, wherein the embedded authentication metadata comprises a listing of previous frame hashes of frames of the video stream that were sent prior to that of the one or more video frames.

4. The method as in claim 1, wherein controlling, based on the authentication determination, presentation of the video stream to the one or more recipient users comprises:
   determining, based on the embedded authentication metadata, whether the one or more recipient users are authorized to view the one or more video frames.

5. The method as in claim 4, wherein the embedded authentication metadata indicates an access level to which the one or more recipient users are assigned.

6. The method as in claim 1, wherein the embedded authentication metadata comprises a sequence number for the one or more video frames.

7. The method as in claim 1, further comprising:
   using key information associated with the sender to authenticate a digital signature included in the embedded authentication metadata; and
   inserting, in response, a watermark into the one or more video frames indicative of the one or more video frames being deemed authentic.

8. The method as in claim 1, wherein the video stream is part of a videoconference.

9. The method as in claim 1, wherein the embedded authentication metadata further includes location information associated with the sender of the video stream, and wherein the device further bases the authentication determination on the location information.

10. An apparatus, comprising:
    one or more network interfaces;
    a processor coupled to the one or more network interfaces and configured to execute one or more processes; and
    a memory configured to store a process that is executable by the processor, the process when executed configured to:
    receive a video stream, wherein one or more video frames of the video stream include embedded authentication metadata that is embedded directly into the one or more video frames by replacing one or more least significant bits of one or more pixels of the one or more video frames, wherein the embedded authentication metadata is used as an in-band metadata for authenticating the video stream;
    extract the embedded authentication metadata from the one or more video frames;
    make an authentication determination regarding the video stream, based on the embedded authentication metadata, wherein the authentication determination includes i) verification of a digital signature associated with a sender of the video stream within the embedded authentication metadata to verify the video stream was genuinely sent by the sender, and ii) a determination to which users are authorized to view the video stream; and control, based on the authentication determination, presentation of the video stream to one or more recipient users.

11. The apparatus as in claim 10, wherein the embedded authentication metadata comprises a hash of the one or more video frames that was signed using the digital signature associated with the sender of the video stream.

12. The apparatus as in claim 10, wherein the embedded authentication metadata comprises a listing of previous frame hashes of frames of the video stream that were sent prior to that of the one or more video frames.

13. The apparatus as in claim 10, wherein the apparatus controls presentation of the video stream to the one or more recipient users by: determining, based on the embedded authentication metadata, whether the one or more recipient users are authorized to view the one or more video frames.

14. The apparatus as in claim 13, wherein the embedded authentication metadata indicates an access level to which the one or more recipient users are assigned.

15. The apparatus as in claim 10, wherein the embedded authentication metadata comprises a sequence number for the one or more video frames.

16. The apparatus as in claim 10, wherein the process when executed is further configured to:

use key information associated with the sender to authenticate a digital signature included in the embedded authentication metadata; and insert, in response, a watermark into the one or more video frames indicative of the one or more video frames being deemed authentic.

17. The apparatus as in claim 10, wherein the video stream is part of a videoconference.

18. A computer-readable medium that is tangible, non-transitory, and stores program instructions that cause a device to execute a process comprising:

receiving, at a device, a video stream, wherein one or more video frames of the video stream include embedded authentication metadata that is embedded directly into the one or more video frames by replacing one or more least significant bits of one or more pixels of one or more video frames, wherein the embedded authentication metadata is used as an in-band metadata for authenticating the video stream;

extracting, by the device, the embedded authentication metadata from the one or more video frames;

making, by the device, an authentication determination regarding the video stream, based on the embedded authentication metadata, wherein the authentication determination includes i) verification of a digital signature associated with a sender of the video stream within the embedded authentication metadata to verify the video stream was genuinely sent by the sender, and ii) a determination to which users are authorized to view the video stream; and controlling, by the device and based on the authentication determination, presentation of the video stream to one or more recipient users.

* * * * *